US007672288B1

(12) United States Patent
Iartym (10) Patent No.: US 7,672,288 B1
(45) Date of Patent: Mar. 2, 2010

(54) ARRANGEMENT FOR SECURE COMMUNICATION AND KEY DISTRIBUTION IN A TELECOMMUNICATION SYSTEM

(75) Inventor: Igor Iartym, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/701,287

(22) PCT Filed: Mar. 28, 2000

(86) PCT No.: PCT/FI00/00258

§ 371 (c)(1),
(2), (4) Date: Nov. 28, 2000

(87) PCT Pub. No.: WO00/59252

PCT Pub. Date: Oct. 5, 2000

(30) Foreign Application Priority Data

Mar. 29, 1999 (FI) ...................................... 990694

(51) Int. Cl.
*H04J 3/16* (2006.01)
(52) U.S. Cl. ........................ 370/349; 370/351; 455/433
(58) Field of Classification Search ................ 370/328, 370/338, 352, 389, 390, 392, 349, 400, 401, 370/469, 474, 350, 351; 455/433
See application file for complete search history.

(56) References Cited

U.S. PATENT DOCUMENTS 5,325,362 A * 6/1994 Aziz ........................... 370/405

(Continued)

FOREIGN PATENT DOCUMENTS

EP 0 578 041 1/1994

OTHER PUBLICATIONS

IEEE International Conference on Communications, 1998, Conference Record 1998, p. 1690-1695. Mobile Internet Access and QoS Guarantees Using Mobile IP and RSVP with Location Registers. Ravi Jain et al. p. 1691 columne 2-p. 1692.

(Continued)

*Primary Examiner*—William Trost, IV
*Assistant Examiner*—Roberta A Shand
(74) *Attorney, Agent, or Firm*—Pillsbury Winthrop Shaw Pittman, LLP (57) ABSTRACT

The invention relates to mobility management of an Internet-type protocol traffic in a mobile communications system. At least one mobile exchange (DXT1, DXT2) in the mobile communications system is arranged to operate as a gateway which interfaces (router 1) the mobile communications system with external data networks. All the mobile exchanges (DXT1, DXT2) are arranged to use a user identity and a data equipment identity for identifying each mobile host and to use an identity of the mobile exchange currently serving the mobile host for defining the location of the mobile host. Each mobile host is dynamically or permanently allocated an IP address which is bound to the user identity, the data equipment identity and the location information of the respective mobile host. The use of the user identity and the data terminal identity provide a unique identification for the mobile host without any relation to the IP network. Also the location information is independent of the IP network. As a consequence, the mobile exchanges are able to route IP datagrams having the allocated IP address from a gateway exchange (DXT1) to the serving exchange (DXT2) according to the location information and further to the respective mobile host according to the user identity and the data equipment identity bound to the IP address by using a mobile network specific routing method instead of mobile IP tunnelling.

16 Claims, 4 Drawing Sheets

U.S. PATENT DOCUMENTS

| | | | | |
|---|---|---|---|---|
| 6,016,318 | A | * | 1/2000 | Tomoike ...................... 370/401 |
| 6,047,194 | A | * | 4/2000 | Andersson .................. 455/466 |
| 6,137,791 | A | * | 10/2000 | Frid et al. ................... 370/352 |
| 6,147,986 | A | * | 11/2000 | Orsic .......................... 370/349 |
| 6,272,129 | B1 | * | 8/2001 | Dynarski et al. ............ 370/356 |
| 6,434,134 | B1 | * | 8/2002 | La Porta et al. ............. 370/338 |
| 6,438,370 | B1 | * | 8/2002 | Einola et al. ............. 455/422.1 |
| 6,469,998 | B1 | * | 10/2002 | Burgaleta Salinas et al. ..... 370/338 |
| 6,473,411 | B1 | * | 10/2002 | Kumaki et al. ............... 370/331 |
| 6,600,732 | B1 | * | 7/2003 | Sevanto et al. .............. 370/349 |
| 6,697,355 | B1 | * | 2/2004 | Lim ........................... 370/352 |
| 6,717,925 | B1 | * | 4/2004 | Leppisaari et al. .......... 370/312 |

OTHER PUBLICATIONS

IEEE International Conference on Communications, 1998, Conference Record, 1998, pp. 1810-1816. Performance Evaluation of Mobile IP Protocols in a Wireless Environment, Maurizio Dell'Abate et al; p. 1811, columne 2—p. 1812 columne 2.

Danny Cohen et al., "IP Addressing and Routing in a Local Wireless Network," INFOCOM '92, IEEE, p. 626-632, (1992).

Jari Hamalainen et al., "Proposed Operation of GSM Packet Radio Networks," p. 372-377, (1995).

* cited by examiner

| IP Address | Location DXT | Static/Dynamic | User Identifier | NSAPI |
|---|---|---|---|---|
| 192.1.1.1 | DXT2 | S | SSI A | NSAPI 1 |
| 192.1.1.52 | DXT3 | D | SSI A | NSAPI 2 |
| 192.1.1.62 | DXT4 | D | SSI B | NSAPI 1 |

ARRANGEMENT FOR SECURE COMMUNICATION AND KEY DISTRIBUTION IN A TELECOMMUNICATION SYSTEM

FIELD OF THE INVENTION

This is a U.S. National Stage application of PCT/FI00/00258 filed Mar. 28, 2000, which claims priority benefit from Finland Patent Application No. 990694, filed Mar. 29, 1999, the entire contents of which are incorporated herein by reference.

The invention relates to mobility management of an Internet-type protocol traffic in a mobile communications system.

BACKGROUND OF THE INVENTION

Mobile communications system refers generally to any telecommunications system which enables wireless communication when users are moving within the service area of the system. A typical mobile communications system is a Public Land Mobile Network (PLMN). Often the mobile communications network is an access network providing a user with wireless access to external networks, hosts, or services offered by specific service providers.

One of the main targets in the development of mobile communications networks is to provide the user with IP (Internet Protocol) service, i.e. access to the Internet through a mobile communication network. It is desired that the IP will be implemented as an overlay of the mobile network, while backwards compatibility with present systems is maintained with minimal modifications in the present standards. However, a problem is that the basic IP concept does not support user mobility: the IP addresses are assigned to network interfaces on the basis of their physical location. In fact, the first field of an IP address (the NETID) is common to all interfaces that are linked to the same Internet subnet. This scheme prevents the user (the mobile host) from keeping his/her address when moving in different Internet subnets, i.e. when changing the physical interface.

In order to enhance mobility in the Internet, a Mobile IP protocol for IP version 4 has been introduced by the Internet Engineering Task Force (IETF) in the standard RFC2002. The mobile IP enables the routing of IP datagrams to mobile hosts independently of the point of attachment in the subnetwork. The mobile IP protocol introduces the following new functional or architectural entities.

'Mobile Node MN' (also called Mobile Host MH) refers to a host that changes its point of attachment from one network or subnetwork to another. A mobile node may change its location without changing its IP address; it may continue to communicate with other Internet nodes at any location using its (permanent) IP address. 'Mobile Station (MS)' is a mobile node having a radio interface to the network. A 'Tunnel' is the path followed by a datagram when it is encapsulated. The encapsulated datagram is routed to a known decapsulation agent, which decapsulates the datagram and then correctly delivers it to its ultimate destination. Each mobile node is connected to a home agent over a unique tunnel, identified by a tunnel identifier which is unique to a given Foreign Agent/Home Agent pair.

'Home Network' is the IP network to which a user logically belongs. Physically, it can be e.g. a local area network (LAN) connected via a router to the Internet. 'Home Address' is an address that is assigned to a mobile node for an extended period of time. It may remain unchanged regardless of where the MN is attached to the Internet. Alternatively, it could be assigned from a pool of addresses.

'Mobility Agent' is either a home agent or a foreign agent. 'Home Agent HA' is a routing entity on a mobile node's home network which tunnels packets for delivery to the mobile node when it is away from home and maintains current location information for the mobile node. It tunnels datagrams for delivery to, and, optionally, detunnels datagrams from, a mobile node when the mobile node is away from home. 'Foreign Agent FA' refers to a routing entity in a mobile node's visited network which provides routing services to a registered mobile node, thus allowing the mobile node to utilise its home network address. The packets tunnelled by the mobile node's home agent are detunnelled and delivered to the mobile node by the foreign agent. For datagrams sent by the mobile node, the foreign agent may serve as a default router for registered mobile nodes.

RFC2002 defines 'Care-of Address' (COA) as the termination point of a tunnel toward a mobile node, for datagrams forwarded to the mobile node when it is away from home. The protocol can use two different types of care-of addresses: a "foreign agent care-of address" is an address announced by a foreign agent with which the mobile node is registered, and a "co-located care-of address" is an externally obtained local address which the mobile node has acquired in the network. An MN may have several COAs at the same time. An MN's COA is registered with its HA. The list of COAs is updated when the mobile node receives advertisements from foreign agents. If an advertisement expires, its entry or entries should be deleted from the list. One foreign agent can provide more than one COA in its advertisements. 'Mobility Binding' is the association of a home address with a care-of address, along with the remaining lifetime of that association. An MN registers its COA with its HA by sending a Registration Request. The HA replies with a Registration Reply and retains a binding for the MN.

The article "Performance Evaluation of Mobile IP Protocols in a Wireless Environment", Maurizio Dell' Abate et al, IEEE International Conference on Communications, 1998, Conference Record, 1998, p. 1810-1816, discloses a Route Optimization MIP scheme which enhances the basic mobile IP (MIP). According to ROMIP, packets addressed to a particular host can be tunnelled directly from the source so that the intervention by the home agent is bypassed. The ROMIP allows every traffic source to cache and use binding copies. The original binding for a mobile host is kept in its home agent, but ROMIP supports a further update process in which the binding copy (current COA of the mobile host) is sent to the source host, normally in response to a first IP packet sent to a mobile host not located in the home network. The source host caches the received binding and uses it to tunnel the packet to a foreign agent FA indicated by the COA. When the destination mobile host suddenly moves to another subnet and under another foreign agent, the mobile host sends, immediately after it has moved, the binding update messages both to the home agent HA and the previous foreign agent FA. The source host has no way to become aware of the movement and it keeps sending IP packets to the old FA. These packets get lost until the old FA receives the above update. As soon as the old FA gets updated, it warns the source host and forwards incoming packets to the new FA. The handover ends when the source host, having received a fresh binding from the home agent HA, can tunnel its packets directly to the new FA.

The article "Mobile Internet Access and QoS Guarantees Using Mobile IP and RSVP with Location Registers", Ravi Jain et al, IEEE International Conference on Communications, 1998, Conference Record, 1998, p. 1690-1695, discloses an alternative route optimization protocol, namely Mobile IP with Location Registers (MIP-LR). According to the MIP-LR, before launching a packet to a mobile host, a sending host first queries a database about the current location of the addressed mobile host. More particularly, when a mobile host moves from one subnet to another, it registers its current COA in a database called a Home Location Register (HLR). When a sending host has a packet to send, it first queries the HLR to obtain the mobile host's COA, and then sends packets directly to the mobile host. The location of the mobile host is also maintained in another database, a Visitor Location Register (VLR) in a visited subnetwork. Two mechanisms are proposed for updating the location of the mobile host in a cache of the sending host when the mobile host moves. In a first mechanism the mobile host informs the old VLR which traps any packets destined to the old COA and sends a binding warning message to the HLR. The HLR sends a binding update message containing the mobile host's new COA to the sending host. In a second mechanism the mobile host maintains a list of all the other hosts it has active connection with, and sends a binding update to each such host.

Neither of these prior art mobility management schemes is absolutely suitable for implementing IP mobility management in a mobile communication system which does not employ IP as a network protocol. The TETRA network, which tunnels IP traffic through a non-IP protocol, is an example of such a system. The TETRA system is a digital mobile communication system developed primarily for professional and governmental users, such as the police, the military, oil plants, etc. The mobility management problem will now be illustrated with reference to FIG. 1 which shows a TETRA network connected to the Internet. The TETRA network comprises digital exchanges DXT and TETRA base stations TBS. There are two possible configurations of how a DXT can be connected to the internet. In the first configuration each DXT unit may have its own direct "exit" via an adjacent router, such as router 1 for DXT1 and router 2 for DXT2 in FIG. 1, for forwarding IP packets from the TETRA network to the Internet and vice versa. In the second configuration only one or some of the DXT units, referred to as gateway DXTs herein, are connected to an Internet router (e.g. DXT1 to router 1 in FIG. 1), and the other DXTs are connected to the Internet over these gateway DXTs.

Figure 1:
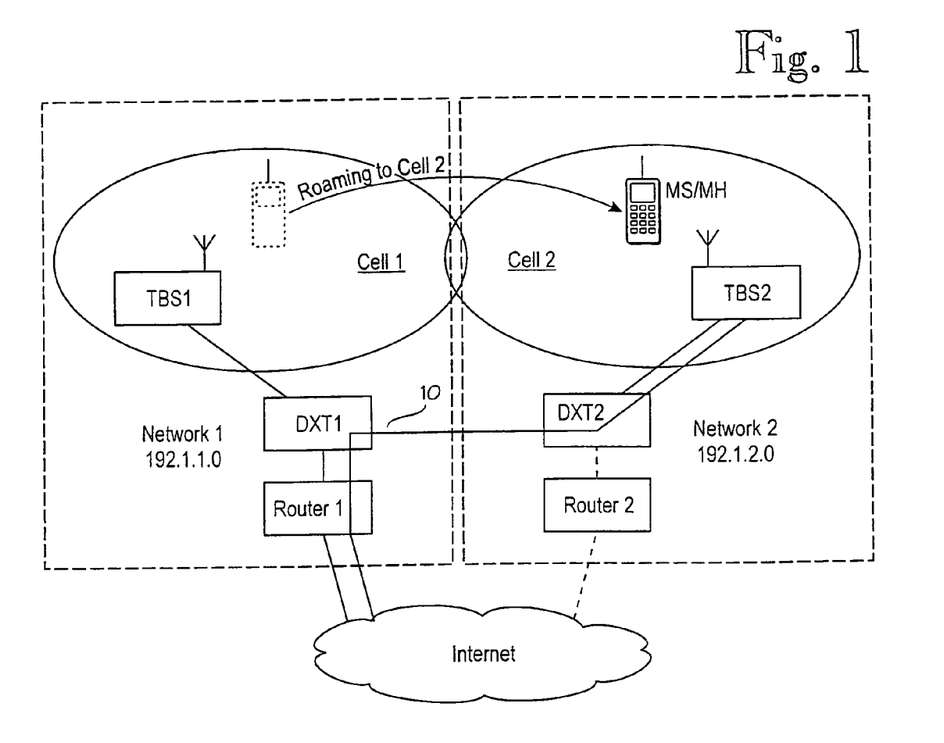
FIG. 1 illustrates a TETRA network connected to the Internet.

Internet routers see TETRA networks as ordinary local IP networks. Each TETRA network is assigned a set of unique IP addresses (IPv4 addresses, for example). The IPv4 address is composed of 32 bits and presented as a network and host identifier pair. The network identifier (netid) specifies a TETRA IP network and the host identifier specifies a mobile host in the TETRA network. In the TETRA network, an IP subnetwork can be formed around one or multiple DXTs. In the latter case, several DXTs will be logically organized under the same netid prefix and will share the same host address space. In the example illustrated in FIG. 1, a TETRA subnetwork 1 is formed around DXT1 and assigned a netid '192.1.1.0', and a TETRA subnetwork 2 is formed around DXT2 and assigned a netid '192.1.2.0'. The organization of IP networks around DXTs requires routing capabilities on the links between them. Each single- or multi-DXT network must be able to forward datagrams destined to other TETRA IP networks. In FIG. 1 the DXT1 and the DXT2 are interconnected by a link 10.

The mobile hosts may move from one cell to another and thereby arbitrarily roam between the DXTs. The mobile host may start an IP data exchange in one network and complete it in another. The movement of the mobile hosts among TETRA networks leads to a situation where the netid identifier in the IP address of the mobile does not necessarily correspond to the current network. The IP address of the mobile host will not correspond to any TETRA network if the user has an IP subscription to another network than the TETRA. Further, the basic Internet routing protocols choose routes based on the destination network identifier but do not support mobility. If TETRA-networks utilize only standard internet routing protocols, IP datagrams will not reach roaming users.

The Mobile IP solves the mobility management problem of the basic IP by adapting to the inflexibility of the IP address, therefore it is not fully applicable to the TETRA network. Some of the mobile IP features unfavourable to the TETRA are listed below:

In the mobile IP, the mobile host is identified with respect to its home IP network, whereas in the TETRA the mobile user is identified by both an individual subscriber identity and a network service point identifier (NSAPI).

In the mobile IP, the mobile host is associated with its home network and dependent on the home agent. In the TETRA this would imply that the mobile host must be bound to a particular network. The dependence on that network reduces the robustness of the IP service as a whole. If the home agent is unreachable at the time when the mobile host, located in a visited network, acquires an IP address, the IP service will be denied. The availability and robustness of the service is especially essential in the TETRA which is used by the police, the fire service, etc., for emergency and command purposes.

In the mobile IP, the location of the mobile host is defined by the network identifier of the current IP network. In the TETRA this would mean that the movement of the mobile host can be detected only if the mobile host moves from one IP network to another. If there is an intention to reuse the existing TETRA infrastructure, then each DXT must be associated with a certain IP network identifier in order to bind the IP network numbers with the TETRA network topology. Each DXT must be equipped with TCP/IP stack and must participate in unnecessary IP tunneling that introduces an IP overhead in each tunneled datagram (a basic unit of information passed in an IP packet). We must also send, or broadcast, MIP messages enclosed in IP packets over the air interface. This will load a poor radio interface link and introduce a 40-byte overhead in each message. The tunneling could be justified only if the TETRA network would utilize Internet routing protocols anyway. The tunneling also means that the traffic flow towards the mobile host must be passed through the home agent making the IP service more vulnerable to a failure of the home agent.

In the mobile IP, the mobile host must carry out an authentication and location update procedure every time it moves to another network. In the TETRA this introduces an additional data exchange over the air interface. Further, the TETRA utilizes specific authentication and location update procedures.

Also the enhanced ROMIP and MIP-LR protocols described in the above mentioned articles are unsuitable to the TETRA. The prior art methods have two features in common: 1) The protocols are designed for IP networks and adapted to the IP environment, consequently both protocols associate the user location with the IP network identifier, 2) The protocols handle mobility in an end-to-end manner, meaning that both communicating ends must take care of mobility management. Therefore, despite the optimizations introduced by the methods, all the inconsistent features which are described above with respect to the basic MIP are also valid for ROMIP and MIP-LR. Further, the ROMIP and MIP-LR can be applied only if both communicating ends support the ROMIP or MIP-LR protocol. Otherwise the communication falls back to the conventional MIP. A further major disadvantage in the ROMIP and MIP-LR relates to handover. The mobile host itself discovers a visited network after having received an advertisement from Foreign Agent. This introduces a certain idle period when none of the agents (Home Agent, old Foreign Agent and new Foreign Agent) knows the real location of the mobile host. During that period an appropriate agent discards datagrams destined to the mobile host.

DISCLOSURE OF THE INVENTION

An object of the invention is to provide an IP mobility management method and a mobile communication system which overcome or alleviate the above described problems.

This and other objects of the invention are achieved with a method and a system which are characterized by what is disclosed in the attached independent claims. Preferred embodiments of the invention are disclosed in the attached dependent claims.

In the present invention the mobile host is identified by a unique pair of a user identity and a data equipment identity which are bound to an IP allocated to a mobile host in the system. The user identity enables to bind the allocated IP address to a specific end user or to a specific mobile station in the mobile communication system. In a preferred embodiment of the invention the user identity is a mobile subscriber identity. The end data equipment identity enables to distinguish between several data equipments connected to the one and the same mobile station. In the preferred embodiment of the invention a network service access point identifier (NSAPI) is used for this purpose. In this context, the term 'end data equipment' refers to any data equipment or IP application connected to, integrated into or associated with a mobile station. The use of the user identity and the data terminal identity provide a unique identification for the mobile host without any relation to the IP network. Further, in most communication systems, such as TETRA, this allows to re-use the identities already available in the communication system.

Further, according to the present invention, the location of the mobile host is defined by the identity of the mobile exchange currently serving the mobile host. The identity of the mobile exchange uniquely identifies a node in the fixed part of the mobile communication network, whereas the mobile exchange, in accordance with the mobility management procedures employed in the communication network, knows the location of the mobile host within the service area of the exchange. Also the location information is bound to the allocated IP address of the mobile host. As a result, an IP datagram having the allocated IP address can be routed to the serving exchange according to location information bound to the IP address in the mobile communication network. The serving mobile exchange is then able to forward the datagram to the destination mobile host according to the user identity and the entry terminal identity bound to the allocated IP address. This inventive concept allows to use a mobile network specific routing method instead of mobile IP tunnelling. Thus, also implementation of the TCP/IP stack in each network node and consequently, the drawbacks of the mobile IP are avoided.

A further advantage of the location management according to the present invention is that handovers within the mobile communication network are transparent to external networks. In other words, the gateway to an external network can be maintained as an anchor point, and the datagrams are only rerouted within the mobile communication network to the new location. As the IP address remains unchanged for the time the mobile host is registered to the mobile communications network, no updatings from the mobile host to the external network are needed due to handovers.

Further, in the present invention the mobile communications network may allocate the IP address to the mobile host from a set of available address spaces. The allocation of the IP address may be permanent (fixed) or the allocation may be carried out dynamically when the mobile host registers to the network. The available address spaces may be distributed over several exchanges. Further, if a serving exchange is unable to allocate the IP address it may acquire the IP address from another exchange. As a result, the availability of the IP service is assured, because the mobile host is not dependent on the links to the home network and availability of the home agent, as in the mobile IP.

The mobility management of the invention also supports a location update between mobile exchanges in the mobile communication system. In an embodiment of the present invention the handover is started at the old exchange which informs a new exchange about the new mobile host and transfers the associated user identity and the associated end data terminal identity to the new exchange. In the preferred embodiment of the invention the old exchange stores the new location of the mobile host for a certain period of time, in order to enable routing of any subsequent datagram to the new exchange. These schemes enable to avoid the idle period encountered in the mobile IP and to make the handovers smoother, thereby reducing datagram loss to minimum.

In a still further embodiment of the invention the location of the mobile host is updated also at the exchange that manages the allocation of IP addresses from the IP address space to which the allocated IP address belongs, if the managing exchange is not one of the exchanges participating with the handover. The gateway exchange, or any other exchange which wishes to route an IP datagram having an IP address with an unknown location, may request the location information from the respective managing exchange and route the datagram, and any subsequent datagrams, to the obtained location. Also in the gateway exchange the obtained location information will be stored only for a predetermined period of time and will be deleted when the period of time expires. If a further datagram having the allocated IP address is received after the deletion of the location information, the gateway will send a new location information request to the managing exchange. The gateway will also reroute the new datagrams to a new location after having received a location update from the old exchange. These measures will assure that the location information and the routing path are kept up-to-date.

BRIEF DESCRIPTION OF THE DRAWINGS

In the following, the invention will be described in greater detail by means of preferred embodiments and with reference to the accompanying drawings, in which.

PREFERRED EMBODIMENTS OF THE INVENTION

The present invention can be generally applied to mobile communications systems for providing IP mobility. The invention can be particularly advantageously used for providing IP mobility management in a mobile telecommunications system that employs a non-IP protocol for routing IP traffic. The TETRA network is an example of such a system. In the following, the preferred embodiments of the invention will be described by means of the TETRA system without limiting the invention to this particular mobile communications system.

The MH may consist of a laptop computer PC connected to a mobile station radio. Alternatively, the MH can be an integrated combination of a small computer and a cellular telephone, similar in appearance to the Nokia Communicator 9000 series. Yet further embodiments of the MH are various pagers, remote-control, surveillance and/or data-acquisition devices, etc.

An example of the possible TETRA architecture is described above with reference to FIG. 1. It should be understood that FIG. 1 only shows a simplified architecture suitable for the description of the present invention. In practice, the TETRA system may include any number of TBSs, DXTs, MHs and routers, as well as other network elements which are relevant to the present invention. As used herein, the TETRA IP network is a collection of DXTs that share the same IP address network prefix. One TETRA network may be subdivided into two or more TETRA IP networks. The protocol which manages the IP service in the TETRA and includes the IP mobility management according to the present invention is called an Address Information Protocol (AIP) herein. The AIP protocol resides on the top of the TETRA transport layer. Consequently, it exchanges control messages with peers utilizing the underlying transport service. The protocol is not required to route datagrams over the shortest path. Local processes can request IP address information from the AIP at least in two cases. Firstly, when the user is requesting the IP service, the process that is responsible for resource allocation requests the AIP for an IP address. Secondly, before the TETRA routing process forwards the IP datagram, it requests the AIP for the current location associated with the destination IP address. The location of the mobile host is specified with the identification number of a TETRA network node. In the preferred embodiment, location is defined in the IP service with the identity (address) of the DXT exchange.

A TETRA IP network can be configured around a dedicated DXT by assigning an IP network identifier. All the IP addresses that are available under the assigned network identifier are called the address space. The AIP entities allocate IP addresses to users from the available address spaces. The allocated IP addresses with their associations are stored in a data structure called an address table. The address space may be divided into static and dynamic address subspaces. The static IP addresses are individually assigned to particular users. The AIP entity, which is assigned an IP network identifier, is called an Address Pool Server (APS) and an AIP entity without an IP network identifier is called an Address Pool Client (APC). Both the APS and APC may co-exist in the AIP process unit. The AIP entity acts as the APC in the following cases: 1) The AIP is not assigned an address space (the AIP is a pure APC), 2) the AIP is assigned an address space, but the address pools are currently exhausted, and 3) The user has no permission to acquire IP addresses from local address pools. If for some reason the AIP cannot allocate an IP address from the local address space, it may acquire an address from a remote APS.

Figure 2:
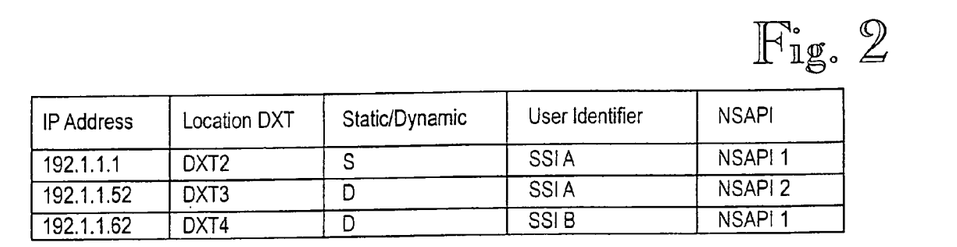
FIG. 2 shows an address table.

When the APS or APC issues an IP address to the user, it creates an entry in the address table for storing the IP address and the current user location. In order to allocate an IP address, the AIP must know both the user identifier and the identifier of the end data equipment or application. The former identifier is necessary to bind the IP address either to the end user or to the end mobile station. The Individual Short Subscriber Identity (SSI) number may serve for this purpose. The latter identifier is necessary to distinguish between several data equipment (or applications) connected to one and the same mobile station. The Network Service Access Point Identifier (NSAPI) may be used for this purpose. An example of a possible address table with a minimal set of fields is shown in FIG. 2. The IP Address entry field lists all allocated IP addresses. The Location DXT field indicates the current locations of the IP users. The Static/Dynamic field shows whether or not the address is permanently assigned to a user. The User Identifier field associates IP addresses with end users. The NSAPI (Network Service Access Point Identifier) field identifies the end data equipment. In the TETRA network, the user may simultaneously use up to 13 data equipment. The number 0 is reserved for a special use and number 15 for multicast. Consequently, there may be more than one entry for one and the same user, i.e. the same SS1 (e.g. SSI A in FIG. 2) but different NSAPIs and IP addresses (e.g. IP address '192.1.1.1' and NSAPI 1 as well as IP address '192.1.1.52' in FIG. 2)

The entry (entries) of a single user in the table of FIG. 2 is herein called a user IP context of the respective user. The IP context of the user may contain several entries. As noted above, the user IP context is created when the APC or the APS issues an IP address to the user. Normally the IP address is issued in response to an address acquisition request from the user. The address acquisition request contains the user and data equipment identifiers SSI and NSAPI. When the APC or APS receives the address acquisition request from the mobile host, it looks up in the address table an entry indicating user and data equipment identifiers that match with the ones in the received request. If the APC or the APS finds such an entry, it completes the request by returning the IP address to the caller. Otherwise, the APC or the APS will attempt to allocate an IP address from the local address space. If there is no IP address available in the address pool, the APC or APS sends an address acquisition request to the remote APS server. The remote APS server obtains an IP address from an address pool and sends it back to the requesting entity. The address may be issued for a predetermined period of time which may be renewed with a specific renewal procedure. The default period may be 12 hours, for example. However, the default time should preferably be such that the IP address does not change during the time the mobile host is registered to the system. When the user no longer needs the IP address, the user requests that the entry or the IP context in the address table is deleted and the IP address is returned to the address pool. If the IP address is permanently allocated, it cannot be allocated to another mobile host.

Figure 3:
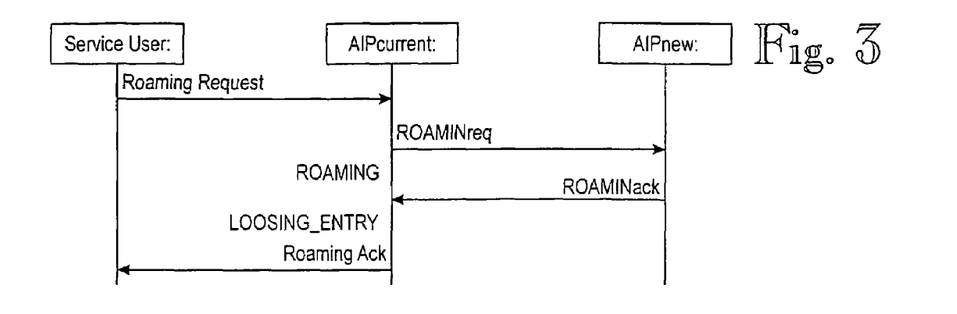
FIG. 3 is a signalling diagram illustrating the transfer of the user IP context in a handover.

The IP context is also transferred from one DXT to another in a handover situation. If, because of the handover, the user IP context is to be transferred to a new DXT, the mobile host notifies the AIP entity in the old DXT of this event by sending a roaming request message, as shown in FIG. 3. The old DXT sends a roaming request ROAMINreq to the AIP entity in the new DXT and assigns a roaming state the entry (entries) of the roaming user in the old DXT. The roaming request ROAMINreq contains the SSI and the copy (copies) of address table entry (entries) associated with the user of the mobile host. Upon receiving the ROAMINreq receipt, the AIP entity in the new DXT attempts to allocate received entries in the address table. If the IP address(es) belong(s) to the IP address space allowed for the new DXT, the new DXT responds to the originator with a roaming ROAMINack acknowledgement as shown in FIG. 3. The acknowledgement contains the SSI and a list of IP addresses allocated in the new DXT for the user of the mobile host, i.e. the same IP addresses as listed in the ROAMINreq. If more than one of the IP addresses in the ROAMINreq fail to belong to the allowable IP address space of the new DXT, i.e. the same IP address is associated with another user, or the new DXT cannot allocate all the IP addresses, the IP address list in the ROAMINack does not contain the non-allocated address(es) and is inconsistent with the list in the ROAMINreq.

On receipt of the acknowledgement, the AIP entity in the old DXT must compare these two lists. The acknowledged entries are moved to a LOOSING_ENTRY state and their timers are set to a routing period which may be equal to 40 minutes for example by default. The unacknowledged entries are deleted and their addresses are returned back to appropriate APSs. Entries at the LOOSING_ENTRY state are deleted when the routing period timer expires.

If the context transfer involves IP addresses allocated from the local address space, the AIP entity in the old DXT, which acts in this case as the APS, moves appropriate entries from an ASSOCIATED_LOCAL to a ROAMING_FROM-APS state. On receipt of the acknowledgement, these entries are moved to an ASSOCIATED_REMOTE state, and their timers are set to a total lease period.

Figure 4:
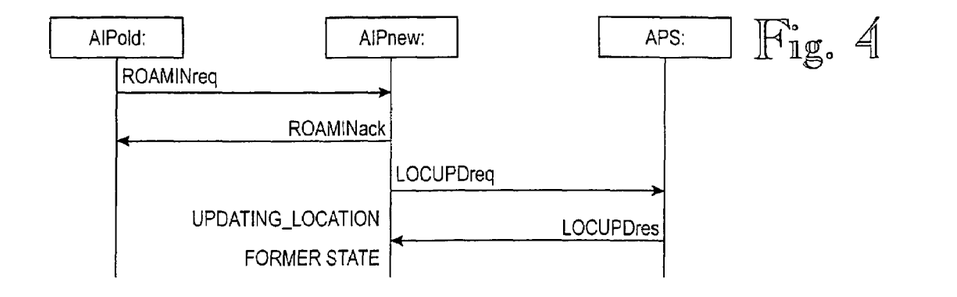
FIG. 4 is a signalling diagram illustrating the transfer of the user IP context and the location update to the APS in a handover.

As described above, on receipt of the ROAMINreq request, the AIP entity in the new DXT attempts to allocate address entries transferred from the old DXT and then it acknowledges successfully allocated entries with a ROAMINack. After this, if addresses have not arrived from the APS in the old DXT, the AIP entity initializes a location update. It sends a location update request LOCUPDreq to the appropriate APS, as shown in FIG. 4, and moves these entries to an UPDATING_LOCATION state. It is assumed that before moving the entry to this state, the AIP saves the current state of the entry. When the APS receives the LOCUPDreq request, it updates the location in the appropriate entries. The APS must always acknowledge the LOCUPDreq request with a location update acknowledgement LOCUPDres. Yet, if the LOCUPDres were lost, the AIP in the new DXT would retransmit a second location update request LOSUPDreq and return the address entry to the former state. If the AIP in the new DXT receives a LOCUPDres acknowledgement from the APS in the UPDATING_LOCATION state, it checks the list of the acknowledged IP addresses. If, because of an exceptional condition, the APS cannot perform location update for some of the addresses, the list will be inconsistent with the list in the LOCUPD request and the AIP in the DXT will release unacknowledged addresses.

Figure 5:
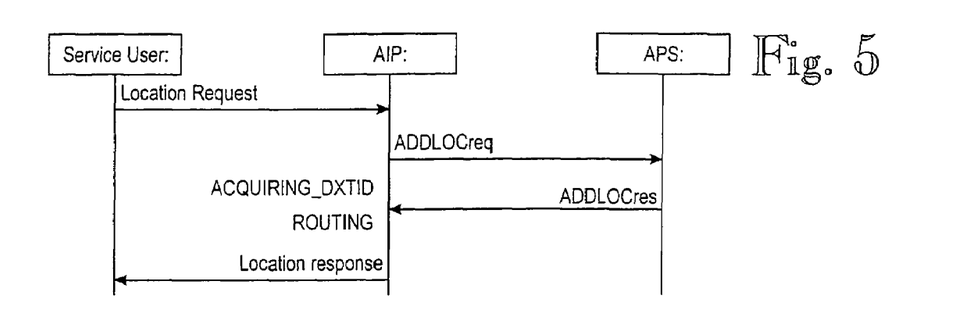
FIG. 5 is a signalling diagram illustrating the acquirement of the location for an IP address.

A particular service user, such as a mobile host or a DXT, may need to resolve IP address locations for destination IP addresses. This can occur occasionally when datagrams arrive to a user who has moved to another DXT, or regularly if the DXT is connected to an Internet router, or if mobile users are allowed to send IP datagrams to one another. The service user in the DXT, responsible for the routing, requests the current IP address location from the local AIP process (in the same DXT) by issuing a location request, as shown in FIG. 5. When the AIP receives such a request for an IP datagram arrived from an external router or from a TBS, it checks whether there is already an entry associated with the IP address in the local address table. If such an entry is found, the AIP returns the DXT identifier to the requesting entity. Otherwise, it queries the database about the APS server which issued the given IP address, sends an address location acquisition request ADDRLOCreq to it, and moves to an ACQUIRING_DXTID state.

The APS responses to the location acquisition request with a ADDRLOCres response carrying the DXT identifier or a zero, which means that the IP address is not currently used. In response to the LOCUPDres received, the AIP in the routing DXT creates an address table entry, called the routing entry, and puts the entry into a ROUTING state which sets the routing entry timer to a value that is one time unit less than the routing period, for example. The time unit for a routing entry is a minute, for example. The default routing period may equal 40 minutes, and by default the timer of the routing entry may be set to 39 minutes, for example. The routing entry is deleted when the respective routing entry timer expires. The AIP in the routing DXT resets the timer every time when an address location request refers to the routing entry.

If after the database call, the AIP in the routing DXT detects an unknown destination IP network, it will complete the request by returning the identifier of the default DXT gateway which connects the TETRA network to the Internet.

Figure 6:
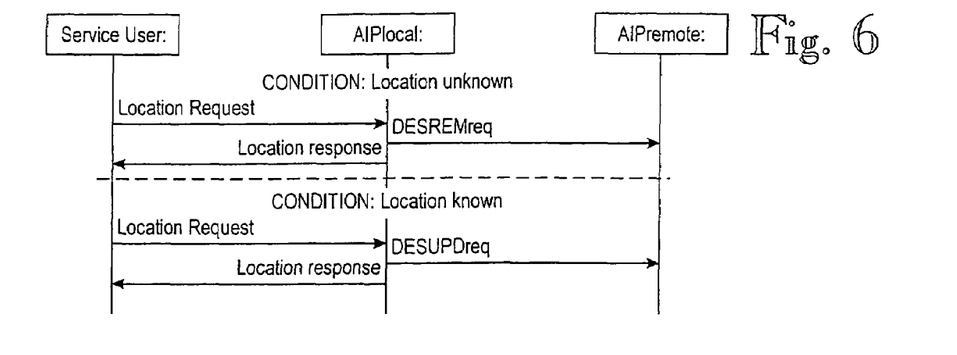
FIG. 6 is a signalling diagram illustrating the update of the address table in a forwarding DXT.

When the AIP in the local DXT receives a location request forwarded from another DXT, and there is no entry associated with the given IP address in the address table, it sends a destination remove request DESREMreq to the AIP in the originating DXT, as shown in FIG. 6. But if the AIP in the local DXT knows where the user with a particular IP address has moved to (entry with specified IP address is in the LOOSING_ENTRY state), it sends an address destination update DESUPDreq message to the AIP in the originating DXT and completes the local location request, as shown at the bottom of FIG. 6.

On the DESUPDreq receipt, the AIP in the originating DXT must update the location field of the appropriate address entry, whereas on the DESREMreq receipt, the AIP in the originating DXT must delete the routing entry. If the APS receives a DESREMreq for one of the local addresses, it moves the appropriate entry from the ASSOCIATED_REMOTE to a WAIT_LOCATION_UPDATE state and keeps its timer field unchanged. The APS deletes this entry on the timer expiration. If the APS receives a LOCUPDreq, LOSUPDreq, ROAMINreq or LEASRENreq message, it moves the entry back to the ASSOCIATED_REMOTE state and behaves accordingly. If the APS receives an ADDRLO- Creq for an entry in the WAIT_LOCATION_UPDATE state, it responds with a negative ADDRLOCres.

In the following, several illustrative scenarios of the IP mobility management and routing according to the invention will be described with reference to FIGS. 7-10. The network elements, i.e. the DXTs, are referred to by their AIP functionality, namely the address pool server (APS) and the address pool client (APC).

Figure 7:
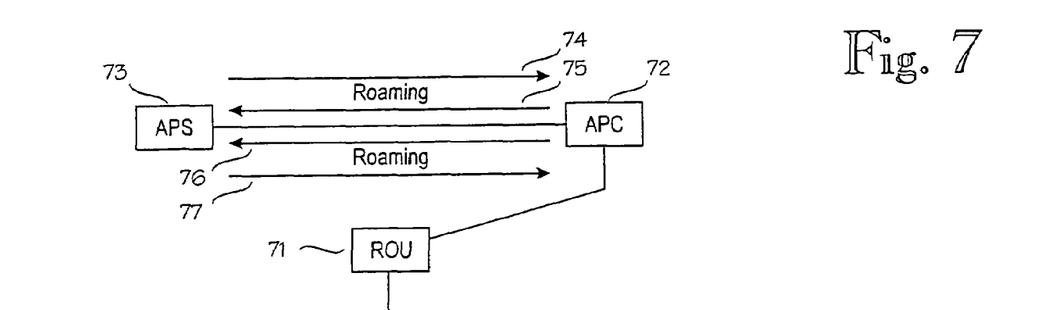
FIG. 7 illustrates a scenario where a mobile host roams from an APS to an APC and vice versa, the APC being connected to the Internet router.

FIG. 7 illustrates a scenario where a mobile host roams from an APS to an APC and vice versa, the APC being connected to an Internet router. Referring to FIG. 7, an Internet router 71 is connected to an APC 72 which operates as a gateway. Let us assume that a mobile host that is currently located at an APS 73 has initially acquired an IP address from an APS 73. The mobile host has also contacted a server in the Internet to establish an IP session and thereby informed the allocated IP address to the server (correspondent host) in the Internet. Thus, no home agent is necessarily involved.

When the Internet server sends the first IP datagram containing the allocated IP address, the IP datagram is routed via the Internet to the router 71 and further to the gateway APC 72. The APC 72 acquires the location of the mobile host from the APS 73, which manages the IP address space where the IP address in the datagram belongs to. The APS 73 responds with the location information, i.e. the identity of the APS 73. The APC 72 also stores the location information for 39 minutes by default, so as to enable the routing of subsequent IP datagrams. Let us now assume that the mobile host roams from the APS 73 to the APC 72 and a handover is initiated. In the handover the APS 73 sends (74) the user IP context to the APC 72, as described above with reference to FIG. 3. The APC 72 acknowledges (75) this and the APS 73 updates the location of the mobile host in the address table. Now, when a datagram having the IP address is received at the APC 72, the APC 72 sends the datagram to the mobile host according to the user identity and the end data terminal identity in the user IP context. After a while, the mobile host roams back to the APS 73 and a handover is again initiated. The APC 72 sends (76) the user IP context to the APS 73. The APS acknowledges (77) this and the APC stores the user location for 40 minutes by default. If a new datagram arrives from the Internet within 40 minutes, the APC 72 correctly forwards it to the APS 73 and sets the location information timer to 39 minutes by default. On the other hand, if a new datagram arrives after 40 minutes, the APC 72 has already deleted the location information for this IP address and therefore acquires the location information again from the APS 73.

Figure 8:
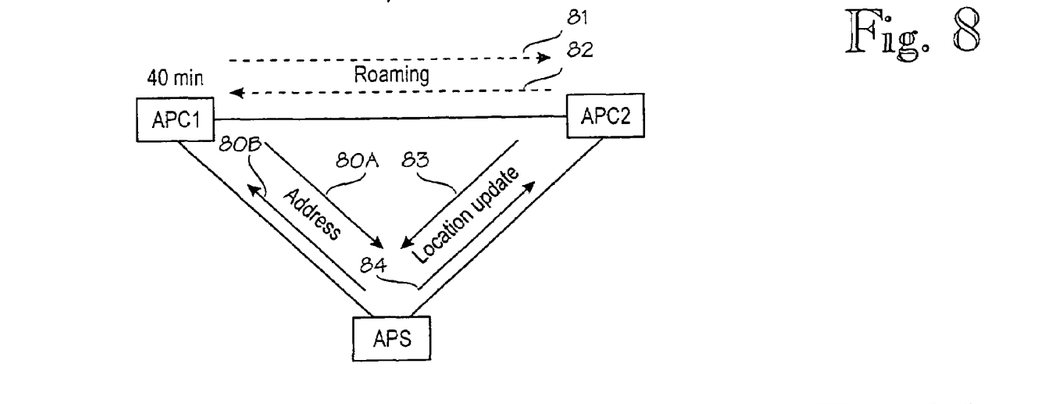
FIG. 8 illustrates a scenario where the mobile host roams between two APCs.

FIG. 8 illustrates a scenario where the mobile host roams between two APCs. Let us assume that the mobile host is initially at the APC1 and acquires (80A,80B) an IP address from the APS. After a while, the mobile host roams to the APC2 and a handover is initiated. The APC1 sends (81) the user IP context to the APC2, which the APC2 acknowledges (82). Having received the acknowledgement, the APC1 stores the new location of the mobile host for 40 minutes by default. Having sent the acknowledgement, the APC2 sends (83) a location update request to the APS. The APS updates the user location and acknowledges (84) this to the APC2. Thus, the location information is kept updated in the different nodes of the system.

Figure 9:
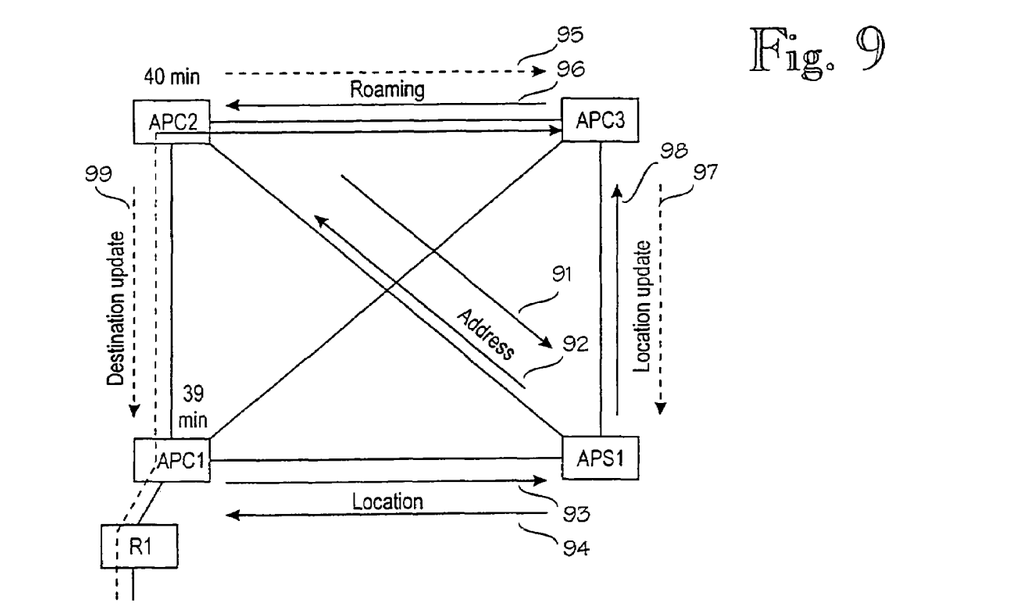
FIG. 9 illustrates a scenario of how the mobility management according to the invention may be conducted in a four-DXT network where only one DXT is connected to the Internet and the mobile host moves from an APC to another.

FIG. 9 illustrates a scenario of how the mobility management according to the invention may be conducted in a four-DXT network where only one DXT is connected to the Internet and the mobile host moves from one APC to another. In FIG. 9, the APC1 is connected to the router R1 in the Internet. Let us assume that the mobile host is initially registered to the APC2 and an Internet address is acquired (91, 92) from the APS1. The mobile host initiates the IP traffic. The first datagram from the Internet arrives at the APC1 over the router R1. The APC1 requests (93, 94) the location information for the IP address from the APS1. The APC1 stores the location in the cache for 39 minutes by default and returns the location to the TETRA routing process which routes the datagram to the APC2. Each time a datagram arrives, the APC1 restarts the timer for the cached location. After a while, the mobile host moves from the APC2 to the APC3 and a handover is initiated. In the handover the APC2 sends the user IP context (95) to the APC3 and the APC3 acknowledges (96) this. Having received the acknowledgement, the APC2 stores the new location in the cache for 40 minutes by default. When the APC3 has completed the handover, it starts a location update procedure (97, 98) to update the location on the mobile host at the APS1. Now a new datagram from the Internet arrives at the APC1. The APC1 forwards the datagram to the APC2 according to the location in the cache. Since the APC2 knows the new location of the mobile host, it forwards the datagram to the APC3. After this the APC2 sends a destination update request (99) to the APC1 in order to update the location information at the APC1. The APC1 caches the new location. As new datagrams arrive, the APC1 forwards them directly to the APC3.

Figure 10:
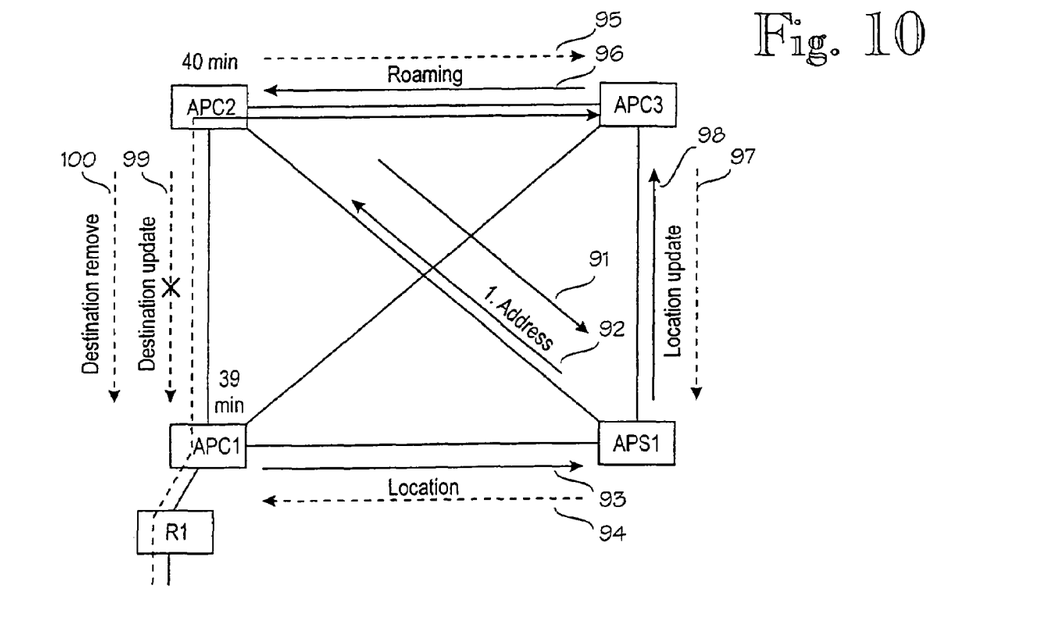
FIG. 10 illustrates a second scenario for the mobility management according to the invention in a four-DXT network where only one DXT is connected to the Internet and the mobile host roams from one APC to another.

FIG. 10 illustrates a second scenario for the mobility management according to the invention in a four-DXT network where only one DXT is connected to the Internet and the mobile host roams from one APC to another. The second scenario is similar to the first one described with respect to FIG. 9 up to the updating of the location (97, 98) at the APS1 by the APC3. The mobile host is now at the APC3. A new datagram from the Internet arrives at the APC1. The APC1 forwards the datagram to the APC2 and restarts the timer for 39 minutes. Since the APC2 knows the new location, it forwards the datagram to the APC3. After this the APC2 sends a destination update request (99) to the APC1 in order to update the location at the APC1. However, because of a link failure the APC1 does not receive the destination update request (99), and the location is not updated. Forty minutes later the APC1 receives a new datagram. The APC1 forwards the datagram to the APC2 according to the location information in the cache of the APC1. Since the location timer in the APC2 has expired, the location information has been deleted and the APC2 no longer knows the new location of the mobile host. As a consequence, the APC2 discards the datagram and sends a destination remove request (100) to the APC1. Having received the destination remove request (100), the APC1 deletes the location of the mobile host in the cache. When a new datagram arrives at the APC1, the APC1 acquires the new location from the APS1 as described above.

Figure 11:
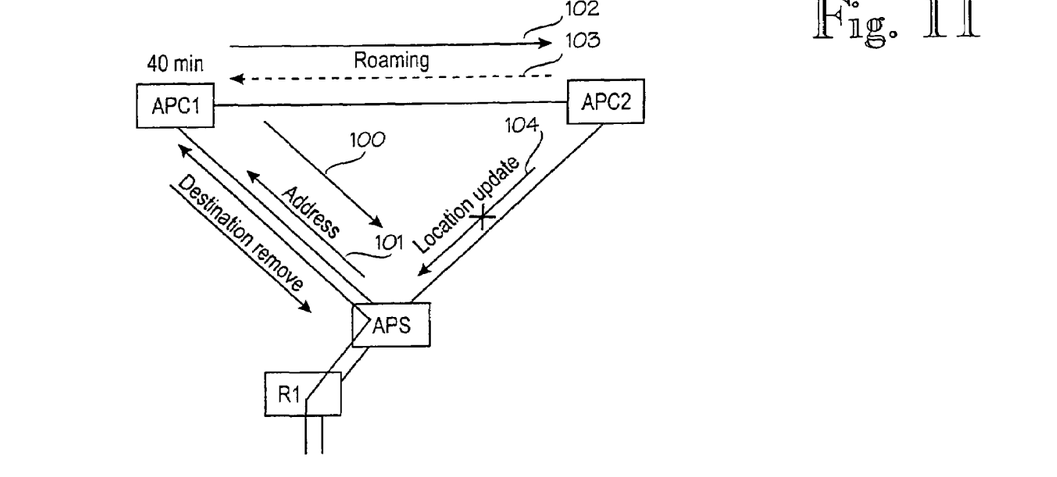
FIG. 11 illustrates a scenario of conducting the mobility management according to the present invention in a three-DXT network where only one DXT is connected to the Internet.

FIG. 11 illustrates a scenario of conducting the mobility management according to the present invention in a three-DXT network where only one DXT is connected to the Internet. In FIG. 11, the APS is connected to the router R1 in the Internet. Let us assume that the mobile host is initially at the APC1, and the APC1 acquires (100, 101) an IP address from the APS. The user IP context is established at the APC1 and the APS. The APS routes the datagrams to the APC1. After a while, the mobile host roams to the APC2 and a handover is initiated. The APC1 sends (102) the user IP context to the APC2, and the APC2 acknowledges (103) this. Having received the acknowledgement, the APC1 stores the new location for 40 minutes by default. Having sent the acknowledgement (103), the APC2 attempts to update (104) the location at the APS but fails because of a link failure. Forty minutes later the APS receives a new datagram. The APS forwards the datagram to the APC1 according to the stored location information. Since the location timer has expired at the APC1, the APC1 no longer knows the new location of the mobile host and discards the datagram and sends a destination remove request (105) to the APS. Having received the destination remove request from the APC1, the APS determines that the location of the mobile host is lost. The APS assigns the user IP context a special state indicating that the IP address is in use but the location is unknown. When a new datagram arrives at the APS, the APS discards the datagram.

The description only illustrates preferred embodiments of the invention. The invention is not, however, limited to these examples, but it may vary within the scope and spirit of the appended claims.

The invention claimed is:

1. A method for providing Internet Protocol-type mobility for a mobile host in a mobile communications system comprising a plurality of mobile hosts, at least two mobile exchanges, at least two Internet Protocol address spaces defining subnetworks in the mobile communication system, a plurality of base stations connected to said mobile exchanges, at least one of the mobile exchanges being arranged to operate as a gateway which interfaces the mobile communications system with external data networks, the method comprising:
    allocating an Internet Protocol address for a mobile host in a first Internet protocol address space;
    using a user identity and a data equipment identity for identifying the mobile host in the mobile communications system, wherein the user identity is a mobile subscriber identity and the data equipment identity is a network service point access identifier;
    defining the location of the mobile host by an identity of a mobile exchange currently serving the mobile host;
    establishing address information which binds the allocated Internet Protocol address to the user identity and the data equipment identity, and which contains the location of the mobile host;
    routing Internet Protocol datagrams having the allocated Internet Protocol address in the first Internet protocol address space from a gateway exchange to the serving exchange and further to the respective mobile host according to said address information;
    updating the location of the mobile host in the address information in a handover from an old mobile exchange in the first Internet Protocol address space to a new mobile exchange in a second Internet Protocol address space,
    sending a roaming request from the mobile host to the old mobile exchange,
    sending a roaming request from the old mobile exchange to the new mobile exchange, said roaming request containing said address information,
    updating the location of the mobile host in said address information at the new mobile exchange,
    sending an acknowledgement from the new mobile exchange to the old mobile exchange, said acknowledgement containing the updated address information; and
    routing the Internet Protocol datagrams having the allocated Internet Protocol address in the first Internet Protocol address to the new exchange in the second Internet Protocol address space according to the updated address information.

2. The method of claim 1, further comprising:
    storing said updated address information at the old mobile exchange for a predetermined routing period so as to enable routing of any subsequent datagram to the new mobile exchange.

3. The method of claim 1, further comprising:
    receiving, subsequent to the handover at the old mobile exchange, a datagram having the allocated Internet Protocol address;
    sending, in response to said subsequent receipt of the datagram, a location update to an originating mobile exchange to indicate the new location of the Internet Protocol address; and
    routing, in response to said location update, any further datagrams having the allocated Internet Protocol address to said new location.

4. A method of providing Internet Protocol-type mobility for a mobile host in a mobile communications system including a plurality of mobile hosts, at least two mobile exchanges, at least two Internet Protocol address spaces defining subnetworks in the mobile communication system, a plurality of base stations connected to said mobile exchanges, at least one of the mobile exchanges being arranged to operate as a gateway which interfaces the mobile communications system with external data networks, the method comprising:
    allocating an Internet Protocol address for a mobile host in a first Internet protocol address space;
    using a user identity and a data equipment identity for identifying the mobile host in the mobile communications system, wherein the user identity is a mobile subscriber identity and the data equipment identity is a network service point access identifier;
    defining the location of the mobile host by an identity of a mobile exchange currently serving the mobile host;
    establishing address information which binds the allocated Internet Protocol address to the user identity and the data equipment identity, and which contains the location of the mobile host, said user identity binding the allocated Internet Protocol address to a specific user or a specific mobile station in said mobile communications system, and said data equipment identity binding said allocated Internet Protocol address to a data equipment or Internet Protocol application connected to, integrated into or associated with the specific mobile station;
    routing Internet Protocol datagrams having the allocated Internet Protocol address in the first Internet protocol address space from a gateway exchange to the serving exchange and further to the respective mobile host according to said address information,
    receiving at the gateway exchange a location update from the mobile exchange indicated by the location information, and
    routing, in response to said location update, any further datagrams having the allocated Internet Protocol address to a new location defining an exchange in a second internet protocol address space as indicated in the location update.

5. A method according to claim 4, further comprising:
    receiving at the serving mobile exchange a datagram having the allocated Internet Protocol address, and
    sending said received datagram from the serving mobile exchange to the mobile host indicated by the user identity and the data equipment identity in said address information.

6. A method according to claim 4, further comprising allocating the IP address to the mobile host dynamically or allocating the IP address permanently.

7. The method of claim 4, further comprising maintaining the address information not only at the currently serving mobile exchange but also at a mobile exchange which manages the allocation of the Internet Protocol address space to which the allocated Internet Protocol address belongs, if the managing mobile exchange is not the same as the serving mobile exchange.

8. The method of claim 7, further comprising:
updating the location of the mobile host in said managing mobile exchange in response to a handover, if the managing mobile exchange is not the old exchange or the new exchange.

9. The method of claim 4, further comprising:
receiving a first datagram addressed to the allocated Internet protocol address at the gateway exchange from the external network;
requesting the location information for the Internet protocol address from a mobile exchange which manages the allocation of the Internet protocol address space to which the allocated Internet protocol address belongs if the managing mobile exchange is not the same as the gateway exchange;
receiving the location information for the Internet protocol address from the managing exchange; and
routing the first datagram and any further datagrams having the allocated Internet protocol address to the serving mobile exchange indicated by said location information.

10. The method of claim 9, further comprising: and
deleting the location information of the Internet Protocol address at the gateway exchange when a predetermined period of time has elapsed from obtaining said location information or from the last reception of a datagram having the allocated Internet Protocol address, and
re-requesting the location information of the Internet Protocol address from the managing exchange if a datagram having the allocated Internet Protocol address is received after the deletion.

11. A mobile communication system comprising:
a plurality of mobile hosts,
at least two mobile exchanges, at least one of the mobile exchanges being arranged to operate as a gateway which interfaces the mobile communications system with external data networks,
at least two Internet Protocol address spaces defining subnetworks in the mobile communication system,
a plurality of base stations connected to said mobile exchanges, and a mobility mechanism for providing Internet Protocol-type mobility for the mobile hosts, the mobility mechanism comprising
the mobile exchanges being configured to use a user identity and a data equipment identity for identifying each mobile host and to use an identity of the mobile exchange currently serving the mobile host for defining the location of the mobile host, wherein the user identity is a mobile subscriber identity and the data equipment identity is a network service point access identifier,
each mobile host having a dynamically or permanently allocated Internet Protocol address in a first Internet Protocol address space, which is bound to the user identity, the data equipment identity and the location information of the respective mobile host,
the mobile exchanges being configured to route Internet Protocol datagrams having the allocated Internet Protocol address from a gateway exchange to the serving exchange according to the location information and further to the respective mobile host according to the user identity and the data equipment identity bound to the Internet Protocol address, and
the mobile exchanges being configured to update the location information in a handover from an old exchange in the first Internet Protocol address space to a new exchange in a second Internet Protocol address space, and
wherein the old mobile exchange is configured to maintain the updated location information for the allocated Internet Protocol address for a predetermined routing period, in order to enable the routing of any further datagrams having the allocated Internet Protocol address to the new exchange, and the old mobile exchange is further arranged to, in response to the receipt of said further datagrams having the allocated Internet Protocol address, to update the location information of the Internet Protocol address in an originating mobile exchange, typically in the gateway exchange, to allow the originating exchange to reroute any further datagrams having the allocated Internet Protocol address to said new location defining the new exchange in the second Internet Protocol address space.

12. A mobile communication system comprising:
a plurality of mobile hosts;
at least two mobile exchanges, at least one of the mobile exchanges being arranged to operate as a gateway which interfaces the mobile communications system with external data networks;
at least two internet Protocol address spaces defining subnetworks in the mobile communication system,
a plurality of base stations connected to said mobile exchanges;
and a mobility mechanism for providing Internet Protocol-type mobility for the mobile hosts, the mobility mechanism being configured to use a user identity and a data equipment identity for identifying each mobile host and to use an identity of the mobile exchange currently serving the mobile host for defining the location of the mobile host, wherein the user identity is a mobile subscriber identity and the data equipment identity is a network service point access identifier,
each mobile host having a dynamically or permanently allocated Internet Protocol address in a first Internet protocol address space, which is bound to the user identity, the data equipment identity and the location information of the respective mobile host, said user identity binding the allocated Internet Protocol address to a specific user or a specific mobile station in said mobile communications system, and said data equipment identity binding said allocated Internet Protocol address to a data equipment or Internet Protocol application connected to, integrated into or associated with the specific mobile station,
the mobile exchanges being configured to route Internet Protocol datagrams having the allocated Internet Protocol address from a gateway exchange to the serving exchange according to the location information and further to the respective mobile host according to the user identity and the data equipment identity bound to the Internet Protocol address,
wherein the gateway exchange is configured to route, in response to said location update, any further datagrams having the allocated Internet Protocol address in the first Internet Protocol address space, to a new location defining a new exchange in a second Internet Protocol address space as indicated in the location update.

13. A system according to claim 12, wherein at least one of the exchanges is configured to function as an address pool server which manages the entire Internet Protocol address space in the system or part of it, and that, in addition to the currently serving mobile exchange, the address pool server managing the Internet Protocol address space to which the allocated Internet Protocol address belongs is arranged to store the location, the user identity and the data equipment identity bound to the Internet Protocol address, and that a new exchange is arranged to update the location of the mobile host in said address pool server in response to a hand-over.

14. A system according to claim 13, wherein the gateway exchange is responsive to receiving a first datagram addressed to the allocated Internet Protocol address from the external network, for requesting the location information for the Internet Protocol address from the respective address pool server and for routing the first datagram and any further datagrams having the allocated Internet Protocol address to the serving mobile exchange indicated by said location information.

15. A mobile exchange for a mobile communication system including a plurality of mobile hosts, at least two mobile exchanges, at least two Internet Protocol Address spaces defining subnetworks in the mobile communication system, a plurality of base stations connected to said mobile exchanges, said mobile exchange being arranged to operate as a gateway which interfaces the mobile communications system with external data networks and comprising, for providing Internet Protocol-type mobility for the mobile hosts:
  a mechanism configured to use a user identity and a data equipment identity for identifying each mobile host and to use an identity of the mobile exchange currently serving the mobile host for defining the location of the mobile host, each mobile host having a dynamically or permanently allocated Internet Protocol address in a first Internet Protocol address space, which is bound to the user identity, the data equipment identity and the location information of the respective mobile host, said user identity binding the allocated Internet Protocol address to a specific user or a specific mobile station in said mobile communications system, and said data equipment identity binding said allocated Internet Protocol address to a data equipment or Internet Protocol application connected to, integrated into or associated with the specific mobile station; and
  a mechanism configured to route Internet Protocol datagrams having the allocated Internet Protocol address from a gateway exchange to the serving exchange according to the location information and further to the respective mobile host according to the user identity and the data equipment identity bound to the Internet Protocol address, wherein the user identity is a mobile subscriber identity and the data equipment identity is a network service point access identity;
  a mechanism configured to receive a location update from the mobile exchange i in the first Internet Protocol address space as indicated by the location information, and a mechanism configured to receive a location update from the mobile exchange in the first Internet Protocol address space as indicated by the location information, and
  a mechanism configured to route, in response to said location update, any further datagrams having the allocated Internet Protocol address to a new location defining a new exchange in the second Internet Protocol address space as indicated in the location update.

16. A mobile exchange for a mobile communication system including a plurality of mobile hosts, at least two mobile exchanges, at least two Internet Protocol address spaces defining subnetworks in the mobile communication system, at least one of the mobile exchanges being arranged to operate as a gateway which interfaces the mobile communications system with external data networks, a plurality of base stations connected to said mobile exchanges, said mobile exchange providing Internet Protocol-type mobility for the mobile hosts, the mobile exchange comprising:
  a mechanism configured to use a user identity and a data equipment identity for identifying each mobile host and to use an identity of the mobile exchange currently serving the mobile host for defining the location of the mobile host, each mobile host having a dynamically or permanently allocated Internet Protocol address in a first Internet Protocol address space, which is bound to the user identity, the data equipment identity and the location information of the respective mobile host;
  a mechanism configured to route Internet Protocol datagrams having the allocated Internet Protocol address from a gateway exchange to the serving exchange according to the location information and further to the respective mobile host according to the user identity and the data equipment identity bound to the Internet Protocol address, wherein the user identity is a mobile subscriber identity and the data equipment identity is a network service point access identifier;
  a mechanism configured to update the location information of the mobile host in a handover from either the exchange in a first Internet protocol address space to a new exchange in a second Internet Protocol address space or to the exchange in the first Internet protocol address space from the new exchange in a second Internet Protocol address space;
  a mechanism configured to receive, subsequent to the handover to the new exchange, a datagram having the allocated Internet Protocol address in the first Internet Protocol address space; and
  a mechanism configured to send, in response to said subsequent receipt of the datagram, a location update to an originating exchange to indicate a new location of the Internet Protocol address and to cause the originating exchange, in response to said location update, to route any further datagrams having the allocated Internet Protocol address in the first Internet Protocol address space to said new location defining the new exchange in the second Internet Protocol address space.

* * * * *